(12) United States Patent
Kamiya et al.

(10) Patent No.: US 12,044,144 B2
(45) Date of Patent: Jul. 23, 2024

(54) COMPOSITE-MATERIAL BLADE, ROTARY MACHINE, AND METHOD FOR FORMING COMPOSITE-MATERIAL BLADE

(71) Applicant: MITSUBISHI HEAVY INDUSTRIES, LTD., Tokyo (JP)

(72) Inventors: Masami Kamiya, Tokyo (JP); Ryoji Okabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/911,025

(22) PCT Filed: Jan. 25, 2021

(86) PCT No.: PCT/JP2021/002462
§ 371 (c)(1),
(2) Date: Sep. 12, 2022

(87) PCT Pub. No.: WO2021/186896
PCT Pub. Date: Sep. 23, 2021

(65) Prior Publication Data
US 2023/0101040 A1    Mar. 30, 2023

(30) Foreign Application Priority Data
Mar. 17, 2020   (JP) .................................. 2020-046584

(51) Int. Cl.
*F01D 5/28* (2006.01)
*B29C 70/44* (2006.01)
(Continued)

(52) U.S. Cl.
CPC ............ *F01D 5/282* (2013.01); *B29C 70/443* (2013.01); *F04D 29/388* (2013.01);
(Continued)

(58) Field of Classification Search
CPC ........................................................ F01D 5/282
See application file for complete search history.

(56) References Cited

U.S. PATENT DOCUMENTS

| 8,980,435 | B2 * | 3/2015 | de Diego | F01D 5/284 416/241 B |
| 10,125,617 | B2 * | 11/2018 | Jevons | B29C 70/026 |
| 2015/0104324 | A1 | 4/2015 | Yagi et al. | |

FOREIGN PATENT DOCUMENTS

| JP | 64-31835 A | 2/1989 |
| JP | 2013-155674 A | 8/2013 |
| JP | 2015-199483 A | 11/2015 |

OTHER PUBLICATIONS

English translation of International Search Report for International Application No. PCT/JP2021/002462, dated Apr. 6, 2021.
(Continued)

*Primary Examiner* — Michael L Sehn
(74) *Attorney, Agent, or Firm* — Birch, Stewart, Kolasch & Birch, LLP (57) ABSTRACT

This composite-material blade formed by using a fiber-reinforced resin containing a resin and reinforcing fibers is provided with: a base material part provided on the inner surface of the composite-material blade; and a first cover part for covering the outer surface of the base material part. The base material part is formed by using a carbon fiber-reinforced resin containing a first resin and carbon fibers. The first cover part is formed from an elastic polymer fiber-reinforced resin containing a second resin and elastic polymer fibers, and has more resistance to impact than the base material part.

12 Claims, 5 Drawing Sheets

(51) Int. Cl.
    *F04D 29/38*     (2006.01)
    *B29K 105/04*     (2006.01)
    *B29L 31/08*     (2006.01)

(52) U.S. Cl.
    CPC ....... *B29K 2105/04* (2013.01); *B29L 2031/08* (2013.01); *F05D 2220/32* (2013.01); *F05D 2220/323* (2013.01); *F05D 2230/23* (2013.01); *F05D 2240/30* (2013.01); *F05D 2300/603* (2013.01)

(56) References Cited

OTHER PUBLICATIONS

Written Opinion of the International Searching Authority for International Application No. PCT/JP2021/002462, dated Apr. 6, 2021, with a English translation.

\* cited by examiner

COMPOSITE-MATERIAL BLADE, ROTARY MACHINE, AND METHOD FOR FORMING COMPOSITE-MATERIAL BLADE

TECHNICAL FIELD

The present disclosure relates to a composite blade, a rotary machine, and a method for forming a composite blade.

BACKGROUND ART

A product in which a carbon fiber reinforced plastic (hereinafter abbreviated as CFRP) is applied to a fan blade of an aircraft engine has been commercialized. CFRP has the characteristics of having light weight and high strength, and by applying CFRP to the fan blade of an aircraft engine, it is possible to reduce the weight of the aircraft engine and improve the fuel efficiency of the aircraft. On the other hand, in an aircraft engine, it is necessary to consider collisions such as bird strikes and dust during use, but there is a problem that CFRP alone does not have sufficient impact resistance against bird strike collisions.

In order to deal with this problem, in the disclosure according to PTL 1 below, a metal sheath-shaped member is adhered to cover the leading edge and the tip portion of the fan blade to improve impact resistance.

CITATION LIST

Patent Literature

[PTL 1] Japanese Unexamined Patent Application Publication No. 2013-155674

The application of CFRP as a blade material is also being investigated for industrial gas turbines. In an industrial gas turbine, an intake filter is installed at the upstream suction port of the engine inlet, and thus it is not necessary to consider the entering of birds or dust during use as in an aircraft engine. However, when the outside air temperature is low, there is a concern that the ice generated in the suction port or the front stage of the compressor collides with the blades in the rear stage. Therefore, in order to use CFRP for the rotor blades of industrial gas turbines, it is necessary to improve the impact resistance.

Similar to the fan blades of aircraft engines, the rotor blades of compressors of industrial gas turbines can also be joined with a metal sheath-shaped protective member at the leading edge to improve impact resistance. However, in an industrial gas turbine, it is not necessary to consider the occurrence of a bird strike, and the impact resistance of a metal is not required. Further, when metal is used for the protective member, the weight increases, and the effect of weight reduction by applying the carbon fiber reinforced plastic cannot be fully exhibited.

SUMMARY OF INVENTION

Technical Problem

The present disclosure has been made in view of the above problems, and an object thereof is to provide a composite blade, a rotary machine, and a method for forming a composite blade having improved impact resistance.

Solution to Problem

In order to solve the above-described problems and achieve the object, according to the present disclosure, there is provided a composite blade formed by using a fiber reinforced resin containing a resin and reinforcing fibers, the composite blade including: a preform portion provided on an inner surface of the composite blade; and a first covering unit that covers an outer surface of the preform portion, in which the preform portion is formed by using a carbon fiber reinforced plastic containing carbon fibers and a first resin, and the first covering unit is formed of an elastic polymer fiber reinforced resin containing elastic polymer fibers and a second resin, and has more impact resistance than the preform portion.

In order to solve the above-described problems and achieve the object, according to the present disclosure, there is provided a rotary machine including the above-described composite blade.

In order to solve the above-described problems and achieve the object, according to the present disclosure, there is provided a method for forming a composite blade, in which the preform portion is formed by laminating reinforcing fiber sheets and has a pressure-side surface which is one blade surface in a blade thickness direction, and a suction-side surface which is the other blade surface in the blade thickness direction, and the method includes: a step of arranging the first covering unit in a suction-side molding tool for forming the suction-side surface, and forming a suction-side laminate by laminating the reinforcing fiber sheets; a step of arranging the first covering unit in a pressure-side molding tool for forming the pressure-side surface, and forming a pressure-side laminate by laminating the reinforcing fiber sheets; a step of assembling the suction-side laminate tool and the pressure-side laminate tool such that the suction-side laminate and the pressure-side laminate overlap each other; and a step of heating the suction-side laminate and the pressure-side laminate.

Advantageous Effects of Invention

According to the present disclosure, it is possible to provide a composite blade, a rotary machine, and a method for forming a composite blade having improved impact resistance.

DESCRIPTION OF EMBODIMENTS

Hereinafter, specific examples of the present disclosure will be described in detail with reference to the drawings. It should be noted that this example does not limit this disclosure.

Figure 1:
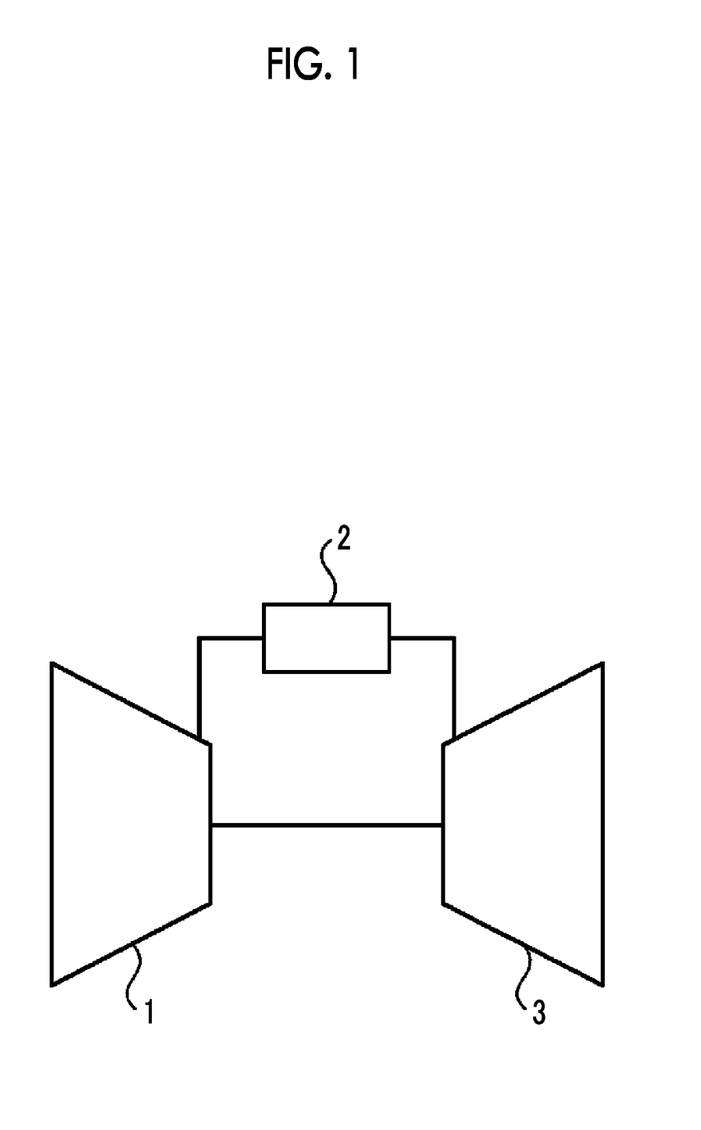
FIG. 1 is a schematic diagram showing an overall configuration of an industrial gas turbine to which a composite blade of the present disclosure is applied.

FIG. 1 is a schematic diagram showing an overall configuration of an industrial gas turbine, which is an example of a rotary machine to which a composite blade of the present disclosure is applied. The application of the composite blades according to the present disclosure is not limited to industrial gas turbines, but can be applied to rotary machines such as turbochargers, aircraft gas turbine engines, and industrial compressors. The industrial gas turbine is composed of a compressor 1, a combustor 2, and a turbine 3. A generator (not shown) is coaxially connected to the industrial gas turbine to enable power generation.

The compressor 1 has an air intake port for taking in air, and in the compressor casing, an inlet guide blade (inlet guide vane (IGV)) is arranged, and a plurality of rotor blades and a plurality of stator blades are alternately arranged. By compressing the air taken in from the air intake port by the compressor 1, the status of air is changed to a high temperature and a high pressure, and is supplied to the casing provided with the combustor 2.

Fuel is supplied to the compressed air supplied to the casing provided with the combustor 2, and combustion gas is generated by burning the fuel. In the turbine 3, a plurality of stator blades and a plurality of rotor blades are alternately arranged in the turbine casing. The turbine 3 is driven by the combustion gas from the combustor 2 and drives a coaxially connected generator.

Example 1

Figure 2:
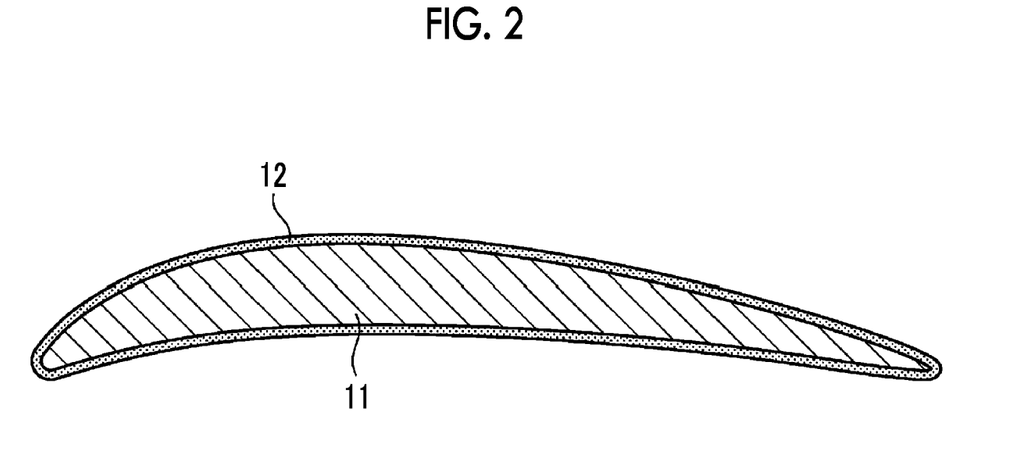
FIG. 2 is a cross-sectional view showing a configuration of Example 1 of the composite blade of the present disclosure.

FIG. 2 is a cross-sectional view showing a configuration of Example 1 of the composite blade of the present disclosure. According to the present disclosure, the composite blade formed by using a fiber reinforced resin containing a resin and reinforcing fibers includes: a preform portion 11 provided on the inner surface of the composite blade; and a first covering unit 12 for covering the outer surface of the preform portion 11. The preform portion 11 is formed by using a carbon fiber reinforced plastic containing carbon fibers and a first resin. The first covering unit 12 is formed from an elastic polymer fiber reinforced resin containing a second resin and elastic polymer fibers, and has more impact resistance than the preform portion 11.

Further, the preform portion 11 has a pressure-side blade surface which is one blade surface in the blade thickness direction and a suction-side blade surface which is the other blade surface in the blade thickness direction. The pressure-side blade surface is a blade surface that serves as a pressure surface, and the blade outer peripheral shape formed by connecting the leading edge and the trailing edge is formed in a shape recessed from the inner surface side to the outer surface side. The suction-side blade surface is a blade surface that serves as a negative pressure surface, and the blade outer peripheral shape formed by connecting the leading edge and the trailing edge is formed in a shape protruding from the inner surface side to the outer surface side.

The preform portion 11 is formed of a carbon fiber reinforced plastic containing a resin and carbon fibers. In addition, the reinforcing fiber used for the preform portion 11 is not limited to carbon fiber, and may be glass fiber. Examples of the resin constituting the preform portion 11 include thermosetting resins such as epoxy resin, phenol resin, and polyimide resin. Other examples thereof include thermoplastic resins such as polyetherimide, polyetheretherketone (PEEK), and polyphenylene sulfide (PPS). Further, the preform portion 11 is formed by laminating a reinforcing fiber sheet (prepreg) in which carbon fibers are impregnated with a resin to form a laminate, and heating the laminate. However, the method for manufacturing the preform portion 11 is not limited thereto.

Since the outer surface of the preform portion 11 is covered with the first covering unit 12 formed by using the elastic polymer fiber reinforced resin, the impact resistance of the composite blade can be improved.

Example 1-1

The first covering unit 12 is laminated at least in a range of 5% to 10% of a chord length from both ends of the chord length of the composite blade and in a range of 5% to 10% of a blade height from a tip of the composite blade, over a thickness of 50% or more of a blade thickness of the composite blade.

The range of 5% to 10% of the chord length from both ends of the chord length of the composite blade corresponds to a part corresponding to the leading edge of the blade and a part corresponding to the trailing edge. This part is a part where the blade thickness is thinner than the location corresponding to the central part of the chord length. Further, the range of 5% to 10% of the blade height from the tip of the composite blade is a part where the blade thickness is thinner than the location corresponding to the central part of the blade height. Therefore, since the first covering unit 12 is provided at the part where the blade thickness of the composite blade is thin, the impact resistance of the composite blade can be improved.

Example 1-2

In addition, it is preferable that the elastic polymer fiber used for the first covering unit 12 be any one of aramid fiber, polyarylate-based fiber, and liquid crystal fully aromatic polyester fiber.

Aramid fiber is a synthetic fiber having a chemical structure of aromatic polyamide. As the aramid fiber, Kevlar (registered trademark), which is polyparaphenylene terephthalamide fiber classified as a para-type aramid fiber, commercially produced by DuPont, is known. Polyparaphenylene terephthalamide is classified as a solution liquid crystal polymer (Thermotropic LCP) that forms a liquid crystal in a solution. In addition, as para-type aramid fibers, Twaron (registered trademark) (official name: polyparaphenylene terephthalamide) produced by AKZO and Technora (registered trademark) (official name: copolyparaphenylene 3.4'oxydiphenylene terephthalamide) produced by Teijin are commercially produced. Examples of the aramid fiber that can be used as the elastic polymer fiber used for the first covering unit of the composite blade according to the present disclosure are as described above, but the present disclosure is not limited thereto.

Aramid fiber has a property of being excellent in impact absorption as compared with carbon fiber. Therefore, by using the aramid fiber as the elastic polymer fiber used for the first covering unit, the impact resistance of the composite blade can be improved.

The polyarylate-based fiber is a synthetic fiber made from a polyester-based liquid crystal polymer. Polyester-based liquid crystal polymers are classified into molten liquid crystal polymers (Thermotropic LCP) that form liquid crystals in a heat-melted state. Polyarylate-based fibers have the characteristics of having high strength and high elastic modulus, as well as hardly absorbing water. As the polyarylate-based fiber, for example, "VECTRAN" (registered trademark) commercially produced by Kuraray can be used. Examples of the polyarylate-based fiber that can be used as the elastic polymer fiber used for the first covering unit are as described above, but the present disclosure is not limited thereto.

By using polyarylate-based fibers as the elastic polymer fibers used for the first covering unit, when a foreign matter collides with the first covering unit 12, the first covering unit 12 is elastically deformed and the impact energy is converted into elastic energy, and thus it is possible to prevent the preform portion 11 from being damaged. Therefore, the impact resistance of the composite blade can be improved.

Liquid crystal fully aromatic polyester is one type of liquid crystal polymer (hereinafter abbreviated as LCP) which exhibits the properties of a liquid crystal in which linear lines of molecules are regularly arranged in a molten state. Liquid crystal polymers (LCP) are classified into solution liquid crystal polymers (Lyotropic LCP) that form liquid crystals in solution and molten liquid crystal polymers (Thermotropic LCP) that form liquid crystals in a heat-melted state. In addition, liquid crystal polymers (LCPs) are also classified as engineering plastics, which have a particularly excellent strength and have enhanced specific functions such as heat resistance. Sumika Super (registered trademark) LCP produced by Sumitomo Chemical is one of the engineering plastics with high heat resistant temperature, has high fluidity, and can be formed by injection molding. Sumika Super can also be molded into a fibrous form by extruding a liquid crystal fully aromatic polyester. In addition, impact resistance can also be improved by using glass fiber-filled liquid crystal fully aromatic polyester, which has improved impact resistance by filling Sumika Super (registered trademark) LCP with glass fiber, for the first covering unit.

By using a liquid crystal fully aromatic polyester fiber as the elastic polymer fiber used for the first covering unit 12, the impact resistance of the composite blade can be improved.

Example 1-3

As shown in FIG. 2, the first covering unit 12 of the composite blade according to the present disclosure is formed over the entire range of the blade surface of the preform portion 11.

Since the first covering unit 12 having impact resistance as compared with the preform portion 11 is formed over the entire range of the blade surface of the preform portion 11, the impact resistance of the composite blade can be improved.

Example 1-4

Further, the first covering unit 12 of the composite blade according to the present disclosure is provided at a part where the blade thickness of the preform portion 11 is thinner than the part where the blade thickness is the thickest. Examples of the part where the blade thickness of the preform portion 11 is thinner than the part where the blade thickness is the thickest include the leading edge, the trailing edge, and the tip portion of the preform portion 11. The leading edge is the upstream end portion of the blade in the circulation direction of the working fluid. On the other hand, the trailing edge is the downstream end portion of the blade in the circulation direction of the working fluid. The tip portion is the end portion on the tip side of the blade in the blade height direction. The leading edge, the trailing edge, and the tip portion of the blade in the entire blade are parts where the blade thickness is thin. Therefore, when the impact resistance of the part is low, there is a possibility that damage occurs due to the collision of foreign matter with the part.

Therefore, by providing the first covering unit 12, which has impact resistance as compared with the preform portion 11, at the part where the blade thickness of the preform portion 11 is thinner than the part where the blade thickness is the thickest, the impact resistance of the composite blade can be improved. In addition, the thickness of the first covering unit may be changed.

Example 2-1

Figure 3:
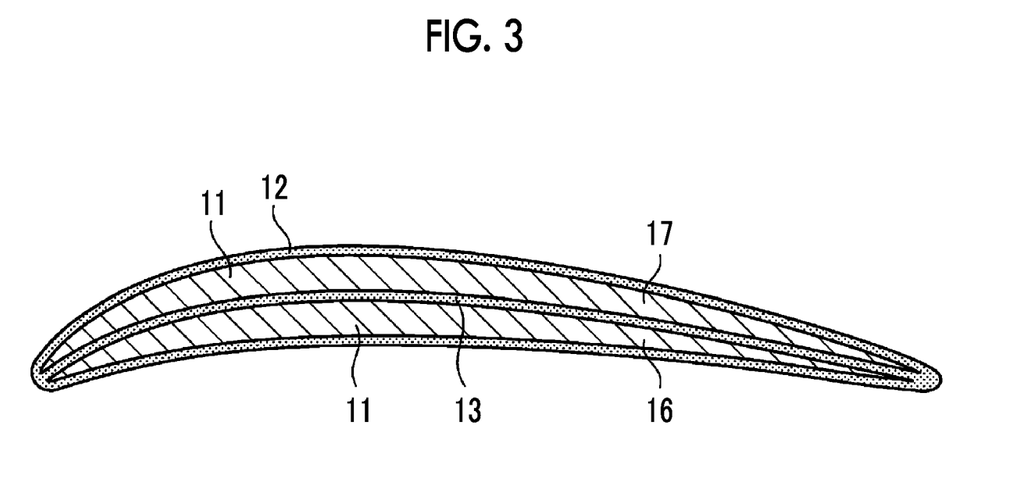
FIG. 3 is a cross-sectional view showing a configuration of Example 2-1 of the composite blade of the present disclosure.

FIG. 3 is a cross-sectional view showing a configuration of Example 2-1 of the composite blade of the present disclosure. The preform portion 11 has a pressure-side blade surface 16 which is one blade surface in the blade thickness direction, a suction-side blade surface 17 which is the other blade surface in the blade thickness direction, and a neutral portion 13 provided between the pressure-side blade surface 16 and the suction-side blade surface 17. The neutral portion 13 is formed by using the same material as the first covering unit 12. The neutral portion 13 is formed to have the same thickness in the blade thickness direction from the leading edge to the trailing edge of the blade. Further, the end portion on the leading edge side of the blade and the end portion on the trailing edge side of the blade in the neutral portion 13 are joined to the end portion on the leading edge side of the first covering unit and the end portion on the trailing edge side of the first covering unit, respectively.

Since the neutral portion 13 is provided between the pressure-side blade surface 16 and the suction-side blade surface 17 and the neutral portion 13 is formed by using the same material as the first covering unit 12, the impact energy received from the outside by the composite blade is reflected and attenuated in the region surrounded by the material having impact resistance, and thus the impact energy can be reduced. Therefore, the impact resistance of the composite blade can be improved.

Example 2-2

Figure 4:
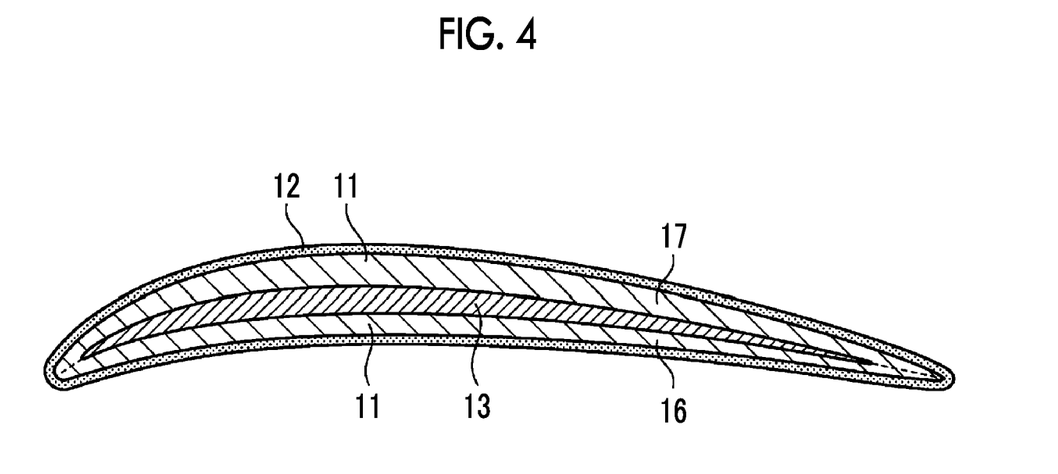
FIG. 4 is a cross-sectional view showing a configuration of Example 2-2 of the composite blade of the present disclosure.

FIG. 4 is a cross-sectional view showing a configuration of Example 2-2 of the composite blade of the present disclosure. The pressure-side blade surface 16 which is one blade surface in a blade thickness direction, the suction-side blade surface 17 which is the other blade surface in the blade thickness direction, and the neutral portion 13 provided between the pressure-side blade surface 16 and the suction-side blade surface 17, are provided, and the neutral portion 13 is formed by using any one of a material obtained by adding an elastomer to a resin-based material and a foam resin.

As the material used for the neutral portion 13, a material obtained by filling a resin-based material with an elastic filler of an elastomer can be used. As the resin-based material, a thermosetting resin such as epoxy resin, phenol resin, or polyimide resin, or a thermoplastic resin such as polyetherimide, polyetheretherketone (PEEK), or polyphenylene sulfide (PPS) can be used. The elastic filler is a filler having a function of filling a resin or the like to impart elasticity. Elastomer is a coined word that combines elastic and polymer. That is, elastomer is a general term for polymers having elasticity. For example, rubber is included in the elastomer. Elastomers can be classified into "thermosetting elastomers" that cure when heat is applied and "thermoplastic elastomers" that soften and exhibit fluidity when heat is applied. As the thermoplastic elastomer, natural rubber, synthetic rubber, silicone rubber, fluororubber and the like can be used. As the thermoplastic elastomer, styrene-based thermoplastic elastomers, amide-based thermoplastic elastomers, ester-based thermoplastic elastomers, olefin-based thermoplastic elastomers, urethane-based thermoplastic elastomers, vinyl chloride-based thermoplastic elastomers, and dynamic sulfurized-based thermoplastic elastomers can be used.

In addition, a foam resin can be used as the material used for the neutral portion 13. The foam resin is a resin matrix in which a large number of bubbles are dispersed. Those in which each bubble is individually sealed are classified as "closed cell type", and those in which each bubble is connected are classified as "open cell type". The "closed cell type" has moderate elasticity and high dimensional retention. The "open cell type" has high flexibility. The methods for generating bubbles in the resin include a "chemical reaction gas utilization method" that uses a chemical reaction, a "low boiling point solvent utilization method" that uses a solvent with a low boiling point, a "mechanical mixing method" that mixes air, and a "solvent removal method" that creates gaps in the process of removing the contained solvent. As the resin used for the foam resin, a thermosetting resin such as epoxy resin, phenol resin, or polyimide resin, or a thermoplastic resin such as polyetherimide, polyetheretherketone (PEEK), or polyphenylene sulfide (PPS) can be used.

By using a material obtained by filling a resin-based material with an elastic filler of an elastomer or a foam resin for the neutral portion 13, the impact energy due to the collision of foreign matter from the outside of the composite blade can be absorbed by elastic deformation of the neutral portion 13, and the impact energy received by the material on the outer surface of the composite blade can be reduced. Therefore, the impact resistance of the composite blade can be improved.

Example 2-3

The preform portion has a pressure-side blade surface which is one blade surface in the blade thickness direction, a suction-side blade surface which is the other blade surface in the blade thickness direction, and a neutral portion provided between the pressure-side blade surface and the suction-side blade surface, and the neutral portion is formed of a foaming material to which a highly elastic filler is added.

As the highly elastic filler, the elastic filler of the above-mentioned elastomer can be used. Examples of the foaming material include the above-mentioned foam resin. That is, the foaming material to which a highly elastic filler is added is, for example, a material to which an elastomer is added to a foam resin.

Example 2-2-1

It is preferable to use a thermoplastic resin as the resin of the foam resin used for the neutral portion 13.

Since the thermoplastic resin has a linear or branched chemical structure, it is considered that deformation resistance is generated due to the elastic properties of the polymer when an external force is applied to the resin due to the structure of the polymer. Therefore, it is considered that the chemical structure of the thermoplastic resin is a factor that exhibits the attenuation characteristics when vibration occurs.

Further, in order to improve the attenuation characteristics of the foam resin, a viscoelasticity-imparting material can be added to the resin used for the foam resin. As the viscoelasticity-imparting material, polybutadiene contained in the above-mentioned synthetic rubber, the above-mentioned "thermosetting elastomer", or "thermoplastic elastomer" can be used. The foam resin obtained by imparting these viscoelasticity-imparting materials to the resin has improved attenuation characteristics. As the resin used for the foam resin, a foam resin to which a viscoelasticity-imparting material is imparted can be used.

By using a thermoplastic resin as the resin of the foam resin used for the neutral portion 13, the vibration attenuation characteristics of the neutral portion 13 can be improved. Therefore, in the neutral portion 13, the elastic energy can be attenuated at an early stage after the impact energy is converted into the elastic energy from the outside, and thus the impact absorption properties of the neutral portion 13 can be improved. Therefore, the impact resistance of the composite blade can be improved.

Example 3

Figure 5:
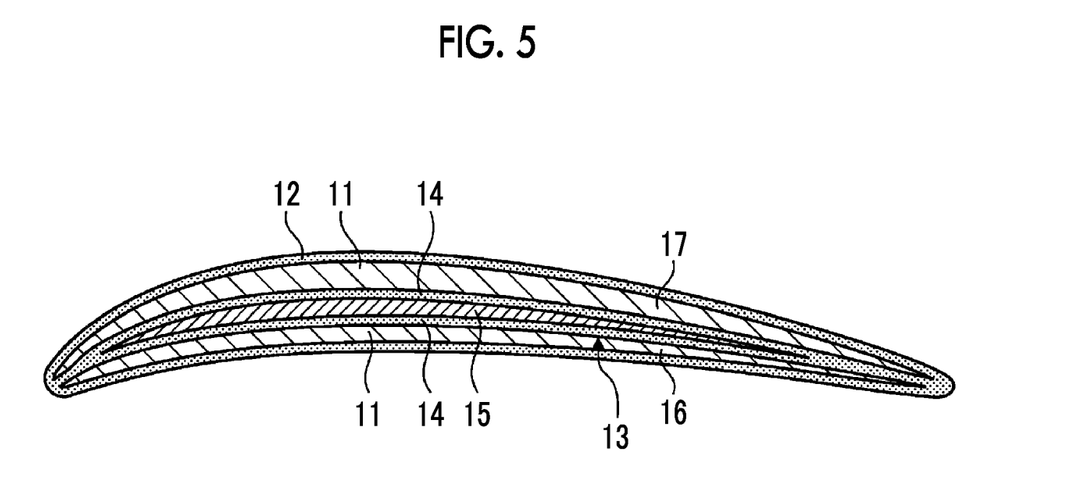
FIG. 5 is a cross-sectional view showing a configuration of Example 3 of the composite blade of the present disclosure.

FIG. 5 is a cross-sectional view showing a configuration of Example 3 of the composite blade of the present disclosure. The preform portion 11 of the composite blade according to the present disclosure has the pressure-side blade surface 16 which is one blade surface in the blade thickness direction, the suction-side blade surface 17 which is the other blade surface in the blade thickness direction, and the neutral portion 13 provided between the pressure-side blade surface 16 and the suction-side blade surface 17. The neutral portion 13 has a second covering unit 14 that covers each of the inner surface side facing the suction-side blade surface 17 on the pressure-side blade surface 16 and the inner surface side facing the pressure-side blade surface 16 on the suction-side blade surface 17, and is formed by using the same composite material as the first covering unit 12, and a cushioning unit 15 provided between the second covering unit 14 of the pressure-side blade surface 16 and the second covering unit 14 of the suction-side blade surface 17.

Since the neutral portion 13 is provided inside the composite blade and the neutral portion 13 includes the second covering unit 14 and the cushioning unit 15, the impact energy received by the material on the surface of the composite blade is absorbed by the cushioning unit 15. Therefore, the impact resistance of the composite blade can be improved.

Example 3-1

As the material used for the cushioning unit 15 of the composite blade according to the above-described present disclosure, a material obtained by filling a resin-based material with an elastic filler of an elastomer, or a foam resin can be used. As the resin-based material, the same material as the resin-based material used for the neutral portion 13 of Example 2-2 can be used. As the elastic filler of the elastomer, the same material as the elastic filler of the elastomer to be filled in the resin-based material of the neutral portion 13 of Example 2-2 can be used. As the foam resin, the similar material to the foam resin used for the neutral portion 13 of Example 2-2 can be used.

By using a material obtained by filling a resin-based material with an elastic filler of an elastomer or a foam resin for the cushioning unit 15, the impact energy due to the collision of foreign matter from the outside of the composite blade can be absorbed by elastic deformation of the cushioning unit 15, and the impact energy received by the material on the surface of the composite blade can be reduced. Therefore, the impact resistance of the composite blade can be improved.

Example 3-2

Figure 6:
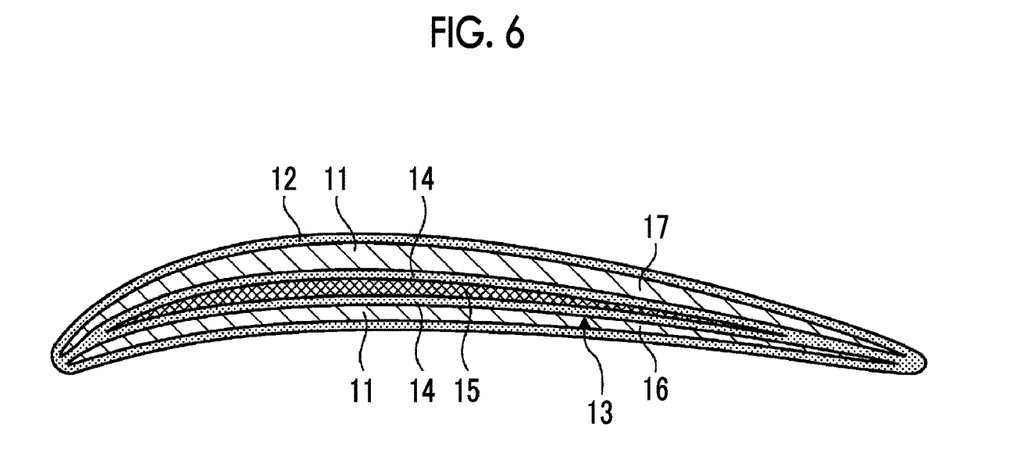
FIG. 6 is a cross-sectional view showing a configuration of Example 3-2 of the composite blade of the present disclosure.
Figure 7:
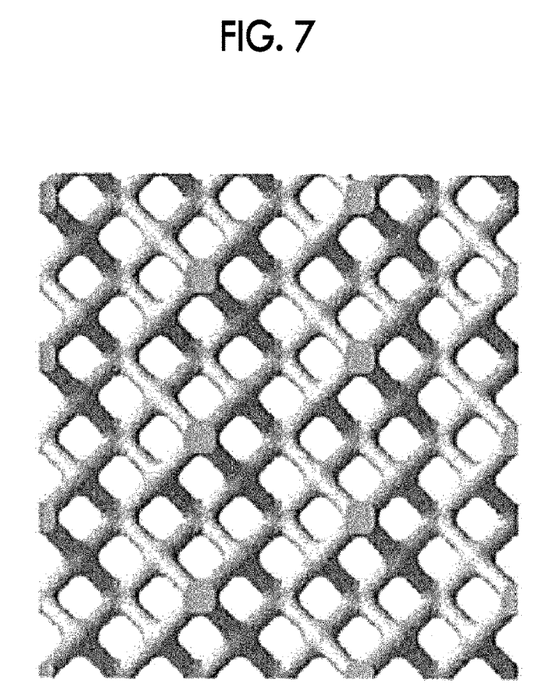
FIG. 7 is an explanatory view showing a structure of a lattice structure.

As shown in FIG. 6, the cushioning unit 15 of the composite blade according to the above-described present disclosure may be formed in a shape of a lattice structure and may be formed by using any one of a metal, a composite material, and a thermoplastic resin. Further, the cushioning unit 15 may be formed in the shape of a structure having cushioning properties, such as a honeycomb structure or a truss structure. As shown in FIG. 7, the lattice structure is a structure formed in a grid pattern. It was not easy to perform modeling by machining, but it became possible to perform modeling easily with a 3D printer. Since the lattice structure has a large number of branches and nodes, it can be expected that the impact energy will be attenuated by elastic deformation like the foam resin. When metal is used as the material for the lattice structure, it can be expected that the rigidity of the entire rotor blade will be improved. Further, when a composite material is used as the material used for the lattice structure, it can be expected that the impact energy attenuation effect will be improved. Further, when a thermoplastic resin is used as the material used for the lattice structure, since the thermoplastic resin is a material having elastic properties, it can be expected to improve the attenuation effect of impact energy.

Therefore, by making the cushioning unit 15 of the composite blade have the above-described configuration, the impact resistance of the composite blade can be improved.
(Specification of Fiber Direction (90 Degrees))

The fibers of the outermost layer of the first covering unit of the composite blade according to the present disclosure are oriented with an inclination of less than 90 degrees with respect to the direction of the fibers on the surface layer of the preform portion. Since the fibers of the outermost layer of the first covering unit are oriented with an inclination of less than 90 degrees with respect to the direction of the fibers on the surface layer of the preform portion, when the fibers expand due to thermal expansion, it is possible to suppress the generation of strain due to the difference in the coefficient of thermal expansion between the fiber used for the first covering unit and the fiber used for the preform portion. Therefore, the strength of the composite blade can be increased.
(Specification of Fiber Direction (45 Degrees))

The fibers of the outermost layer of the first covering unit of the composite blade according to the present disclosure are more preferably oriented with an inclination of 45 degrees with respect to the direction of the fibers on the surface layer of the preform portion. Since the fibers of the outermost layer of the first covering unit are oriented with an inclination of 45 degrees with respect to the direction of the fibers on the surface layer of the preform portion, when the fibers expand due to thermal expansion, it is possible to suppress the generation of strain due to the difference in the coefficient of thermal expansion between the fiber used for the first covering unit and the fiber used for the preform portion. Therefore, the strength of the composite blade can be increased.
(Specification of Fiber Direction (Woven Fabric with 45 Degrees))

As the fiber of the first covering unit of the composite blade according to the present disclosure, a woven fabric having an inclination of 45 degrees with respect to the direction of the fiber of the surface layer of the preform portion may be used. The woven fabric is a plain weave woven fabric in which elastic polymer fiber bundles are formed with an inclination of 90° C. Therefore, it is possible to suppress the generation of strain due to the difference in the coefficient of thermal expansion of the fibers used for the first covering unit and the preform portion. Therefore, the strength of the composite blade can be increased.
(Method for Forming Composite Blade)

Figure 8:
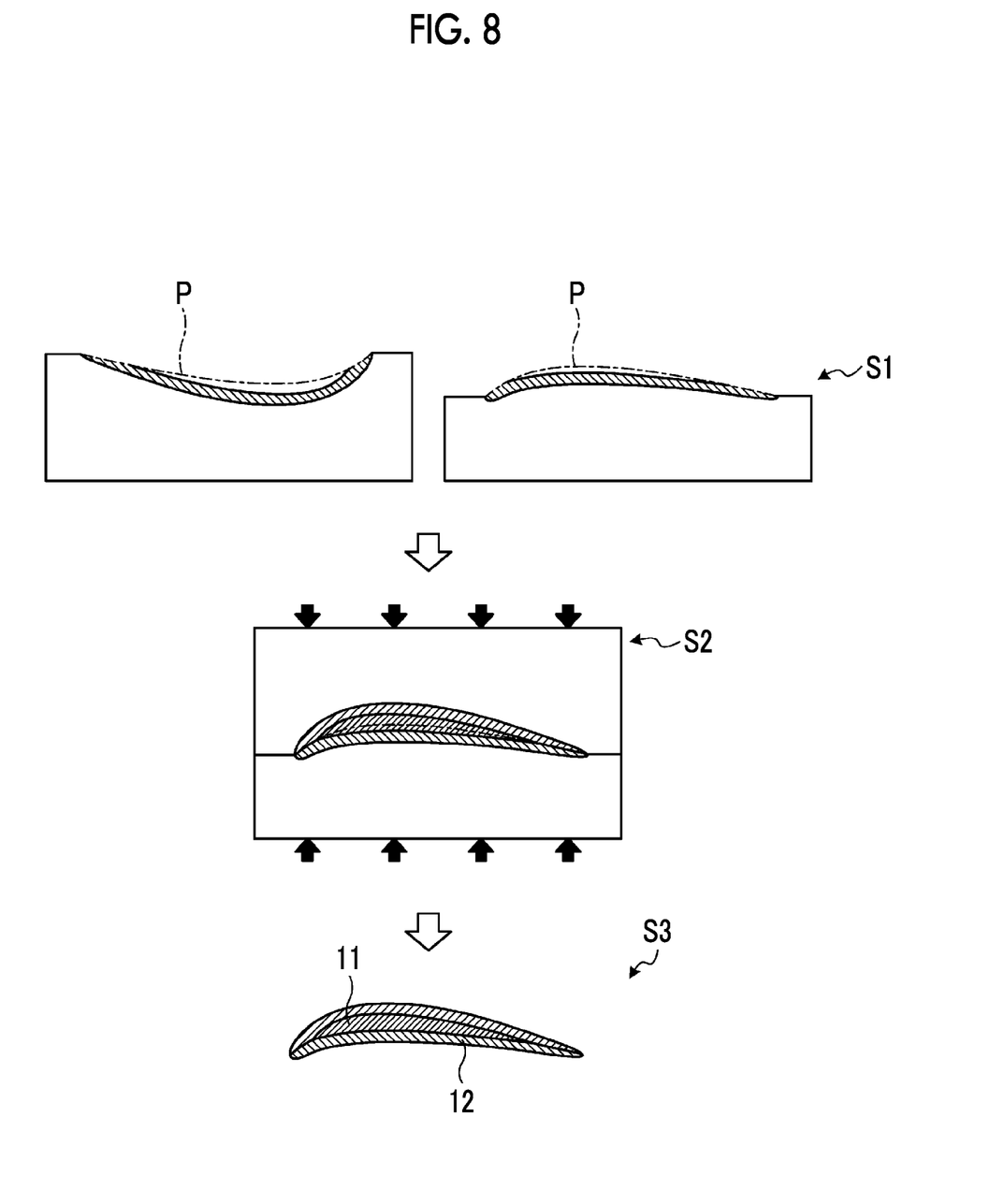
FIG. 8 is an explanatory view related to a method for forming a composite blade.

FIG. 8 is an explanatory view related to a method for forming a composite blade. In the method for forming a composite blade according to the present disclosure shown in FIG. 8, the preform portion 11 is formed by laminating reinforcing fiber sheets P and has the pressure-side blade surface 16 which is one blade surface in a blade thickness direction, and the suction-side blade surface 17 which is the other blade surface in the blade thickness direction, and the method includes: a step S1 of arranging the first covering unit on a suction side in a suction-side molding tool for forming the suction-side blade surface 17, and forming a suction-side laminate by laminating the reinforcing fiber sheets P; a step S1 of arranging the first covering unit on a pressure side in a pressure-side molding tool for forming the pressure-side blade surface 16, and forming a pressure-side laminate by laminating the reinforcing fiber sheet; a step S2 of assembling the suction-side laminate tool and the pressure-side laminate tool such that the suction-side laminate and the pressure-side laminate overlap each other; and a step S3 of heating the suction-side laminate and the pressure-side laminate.

According to this method, a composite blade having impact resistance can be efficiently formed.

According to the present disclosure, there is provided a composite blade formed by using a fiber reinforced resin containing a resin and reinforcing fibers, the composite blade including: a preform portion provided on an inner surface of the composite blade; and a first covering unit that covers an outer surface of the preform portion, in which the preform portion is formed by using a carbon fiber reinforced plastic containing a first resin and carbon fibers, and the first covering unit is formed of an elastic polymer fiber reinforced resin containing a second resin and elastic polymer fibers, and has more impact resistance than the preform portion.

According to this configuration, since the first covering unit has more impact resistance than the preform portion, the impact resistance of the composite blade can be improved by the first covering unit formed on the outer surface of the preform portion.

The first covering unit is laminated in a range of 5% to 10% of a chord length from both ends of the chord length of the composite blade and in a range of 5% to 10% of a blade length from a blade end of the composite blade, over a thickness of 50% or more of a blade thickness of the composite blade.

According to this configuration, since the first covering unit formed on the surface of the preform portion of the rotor blade is formed mainly at the part where the blade thickness of the composite blade is thin, the impact resistance of the composite blade can be improved.

The elastic polymer fiber is any one of aramid fiber, polyarylate-based fiber, and liquid crystal fully aromatic polyester fiber.

According to this configuration, since the aramid fiber, the polyarylate-based fiber, and the liquid crystal fully aromatic polyester fiber are highly elastic fibers, the impact resistance of the composite blade can be improved.

It is preferable that the first covering unit be formed over the entire range of the blade surface of the preform portion.

According to this configuration, the first covering unit having impact resistance is formed over the entire range of the blade surface of the preform portion, the impact resistance of the composite blade can be improved.

The first covering unit is provided at a part where a blade thickness of the preform portion is thinner than the part where the blade thickness is the thickest.

According to this configuration, within the entire composite blade, the part where the blade thickness is thin is covered with the first covering unit formed by using a material having impact resistance, and thus the impact resistance of the composite blade can be improved.

The preform portion has a pressure-side blade surface which is one blade surface in the blade thickness direction, a suction-side blade surface which is the other blade surface in the blade thickness direction, and a neutral portion provided between the pressure-side blade surface and the suction-side blade surface, and the neutral portion is formed by using the same material as the first covering unit.

According to this configuration, the impact energy received from the outside by the composite blade is reflected and attenuated within the region surrounded by the material used for the first covering unit having impact resistance, and accordingly, the impact energy can be reduced. Therefore, the impact resistance of the composite blade can be improved.

The preform portion has a pressure-side blade surface which is one blade surface in a blade thickness direction, a suction-side blade surface which is the other blade surface in the blade thickness direction, and a neutral portion provided between the pressure-side blade surface and the suction-side blade surface, and the neutral portion is formed by using any one of a material obtained by adding an elastomer to a resin-based material and a foam resin.

According to this configuration, the impact energy received from the outside by the composite blade is absorbed by the material obtained by adding the elastomer to the resin-based material or the foam resin, and the impact energy received by the material on the surface of the composite blade can be reduced. Therefore, the impact resistance of the composite blade can be improved.

The preform portion has a pressure-side blade surface which is one blade surface in the blade thickness direction, a suction-side blade surface which is the other blade surface in the blade thickness direction, and a neutral portion provided between the pressure-side blade surface and the suction-side blade surface, and the neutral portion is formed of a foaming material to which a highly elastic filler is added.

According to this configuration, the impact energy received from the outside by the composite blade is absorbed by the elastic deformation of the foaming material to which the highly elastic filler is added, and the impact energy received by the material on the surface of the rotor blade can be reduced. Therefore, the impact resistance of the composite blade can be improved.

The preform portion has a pressure-side blade surface which is one blade surface in a blade thickness direction, a suction-side blade surface which is the other blade surface in the blade thickness direction, and a neutral portion provided between the pressure-side blade surface and the suction-side blade surface, and the neutral portion is formed by using the same composite material as the first covering unit, and has a second covering unit that covers each of an inner surface side facing the suction-side blade surface on the pressure-side blade surface, and an inner surface side facing the pressure-side blade surface on the suction-side blade surface, and a cushioning unit provided between the second covering unit of the pressure-side blade surface and the second covering unit of the suction-side blade surface.

According to this configuration, the impact energy received from the outside by the composite blade is reflected and attenuated by the cushioning unit surrounded by the material having impact resistance, and accordingly, the impact energy received by the material of the surface of the rotor blade can be reduced.

It is preferable that the cushioning unit be formed by using any one of a material obtained by adding an elastomer to a resin-based material and a foam resin.

According to this configuration, the impact energy received from the outside by the composite blade is absorbed by elastic deformation of the material obtained by adding the elastomer to the resin-based material or the foam resin, and the impact energy received by the material on the surface of the composite blade can be reduced. Therefore, the impact resistance of the composite blade can be improved.

It is preferable to use a thermoplastic resin as the resin used for the foam resin.

According to this configuration, since the foam resin has attenuation characteristics, the impact energy received from the outside by the composite blade is converted into elastic energy by the foam resin, and the elastic energy is attenuated at an early stage. Therefore, the impact resistance of the composite blade can be improved.

It is preferable to use a thermoplastic resin as the resin used for the foam resin that forms the cushioning unit.

According to this configuration, since the foam resin has attenuation characteristics, the impact energy received from the outside by the composite blade is converted into elastic energy by the foam resin, and the elastic energy is attenuated at an early stage. Therefore, the impact resistance of the composite blade can be improved.

It is preferable that the cushioning unit be formed in a shape of a lattice structure and be formed by using any one of a metal, a composite material, and a thermoplastic resin.

According to this configuration, the impact energy received from the outside of the composite blade is absorbed by the elastic deformation of the cushioning unit formed in the shape of the lattice structure, and the impact energy received by the material on the surface of the rotor blade can be reduced. Therefore, the impact resistance of the composite blade can be improved.

It is possible to provide a rotary machine equipped with the above-described composite blade.

According to this configuration, by using the composite blade with improved impact resistance for the rotary machine, it is possible to improve the impact resistance against the collision of foreign matter entering the air flow path of the rotary machine.

The direction of the elastic polymer fibers on the outermost layer of the first covering unit has an inclination of less than 90 degrees with respect to the direction of fibers on the surface layer of the preform portion.

According to this configuration, it is possible to prevent the generation of strain due to the difference in the coefficient of thermal expansion. Therefore, the strength of the composite blade can be improved.

The direction of the elastic polymer fibers on the outermost layer of the first covering unit has an inclination of 45 degrees with respect to the direction of fibers on the surface layer of the preform portion.

According to this configuration, it is possible to prevent the generation of strain due to the difference in the coefficient of thermal expansion. Therefore, the strength of the composite blade can be improved.

Elastic polymer fibers of the first covering unit form a woven fabric having an inclination of 45 degrees with respect to a direction of fibers on the surface layer of the preform portion, and the woven fabric is a plain weave woven fabric in which elastic polymer fiber bundles are formed with an inclination of 90 degrees.

According to this configuration, it is possible to prevent the generation of strain due to the difference in the coefficient of thermal expansion. Therefore, the strength of the composite blade can be improved.

There is provided a method for forming a composite blade, which is for forming the above-described composite blade, in which the preform portion is formed by laminating reinforcing fiber sheets and has a pressure-side blade surface which is one end surface in a blade thickness direction, and a suction-side blade surface which is the other end surface in the blade thickness direction, and the method includes: a step of arranging the first covering unit on a suction side in a suction-side molding tool for forming the suction-side blade surface, and forming a suction-side laminate by laminating the reinforcing fiber sheets; a step of arranging the first covering unit on a pressure side in a pressure-side molding tool for forming the pressure-side blade surface, and forming a pressure-side laminate by laminating the reinforcing fiber sheets; a step of assembling the suction-side molding tool and the pressure-side molding tool such that the suction-side laminate and the pressure-side laminate overlap each other; and a step of heating the suction-side laminate and the pressure-side laminate.

According to this configuration, the composite blade according to the present disclosure can be efficiently formed.

REFERENCE SIGNS LIST

1 Compressor
2 Combustor
3 Turbine
11 Preform portion
12 First covering unit
13 Neutral portion
14 Second covering unit
15 Cushioning unit
16 Pressure-side blade surface
17 Suction-side blade surface

The invention claimed is:

1. A composite blade formed by using a fiber reinforced resin containing a resin and reinforcing fibers, the composite blade comprising:
   a preform portion provided on an inner surface of the composite blade; and
   a first covering unit that covers an outer surface of the preform portion, wherein
   the preform portion is formed by using a carbon fiber reinforced plastic containing a first resin and carbon fibers, and
   the first covering unit is formed of an elastic polymer fiber reinforced resin containing a second resin and elastic polymer fibers, and has more impact resistance than the preform portion,
   wherein the preform portion has a pressure-side blade surface which is one blade surface in a blade thickness direction, a suction-side blade surface which is the other blade surface in the blade thickness direction, and a neutral portion provided between the pressure-side blade surface and the suction-side blade surface, and
   the neutral portion is formed by using the same material as the first covering unit,
   wherein a direction of elastic polymer fibers on an outermost layer of the first covering unit has an inclination of less than 90 degrees with respect to a direction of carbon fibers on a surface layer of the preform portion.

2. The composite blade according to claim 1, wherein the first covering unit is laminated at least in a range of 5% to 10% of a chord length from both ends of the chord length of the composite blade and in a range of 5% to 10% of a blade height from a tip of the composite blade, over a thickness of 50% or more of a blade thickness of the composite blade.

3. The composite blade according to claim 1, wherein the elastic polymer fiber of the elastic polymer fiber reinforced resin is any one of aramid fiber, polyarylate-based fiber, and liquid crystal fully aromatic polyester fiber.

4. The composite blade according to claim 1, wherein the first covering unit is provided in an entire range of a blade surface of the preform portion.

5. A method for forming a composite blade, which is for forming the composite blade according to claim 4, wherein
   the preform portion is formed by laminating reinforcing fiber sheets and has a pressure-side blade surface which is one end surface in a blade thickness direction, and a suction-side blade surface which is the other end surface in the blade thickness direction, and
   the method comprises:
   a step of arranging the first covering unit on a suction side in a suction-side molding tool for forming the suction-side blade surface, and forming a suction-side laminate by laminating the reinforcing fiber sheets;
   a step of arranging the first covering unit on a pressure side in a pressure-side molding tool for forming the pressure-side blade surface, and forming a pressure-side laminate by laminating the reinforcing fiber sheets;
   a step of assembling the suction-side molding tool and the pressure-side molding tool such that the suction-side laminate and the pressure-side laminate overlap each other; and
   a step of heating the suction-side laminate and the pressure-side laminate.

6. The composite blade according to claim 1, wherein the first covering unit is provided at a part where a blade thickness of the preform portion is thinner than a part where the blade thickness is the thickest.

7. A composite blade formed by using a fiber reinforced resin containing a resin and reinforcing fibers, the composite blade comprising:

a preform portion provided on an inner surface of the composite blade; and a first covering unit that covers an outer surface of the preform portion, wherein the preform portion is formed by using a carbon fiber reinforced plastic containing a first resin and carbon fibers, the first covering unit is formed of an elastic polymer fiber reinforced resin containing a second resin and elastic polymer fibers, and has more impact resistance than the preform portion, the preform portion has a pressure-side blade surface which is one blade surface in a blade thickness direction, a suction-side blade surface which is the other blade surface in the blade thickness direction, and a neutral portion provided between the pressure-side blade surface and the suction-side blade surface, the neutral portion is formed by using any one of a material obtained by adding an elastomer to a resin-based material and a foam resin, and a direction of elastic polymer fibers on an outermost layer of the first covering unit has an inclination of less than 90 degrees with respect to a direction of fibers on a surface layer of the preform portion.

8. The composite blade according to claim 7, wherein a thermoplastic resin is used as a resin used for the foam resin.

9. A composite blade formed by using a fiber reinforced resin containing a resin and reinforcing fibers, the composite blade comprising:

a preform portion provided on an inner surface of the composite blade; and a first covering unit that covers an outer surface of the preform portion, wherein the preform portion is formed by using a carbon fiber reinforced plastic containing a first resin and carbon fibers, the first covering unit is formed of an elastic polymer fiber reinforced resin containing a second resin and elastic polymer fibers, and has more impact resistance than the preform portion, the preform portion has a pressure-side blade surface which is one blade surface in a blade thickness direction, a suction-side blade surface which is the other blade surface in the blade thickness direction, and a neutral portion provided between the pressure-side blade surface and the suction-side blade surface, the neutral portion is formed of a foaming agent to which an elastic filler is added, and a direction of elastic polymer fibers on an outermost layer of the first covering unit has an inclination of less than 90 degrees with respect to a direction of fibers on a surface layer of the preform portion.

10. The composite blade according to claim 1, wherein the direction of the elastic polymer fibers on the outermost layer of the first covering unit has an inclination of 45 degrees with respect to the direction of carbon fibers on the surface layer of the preform portion.

11. The composite blade according to claim 1, wherein the elastic polymer fibers of the first covering unit form a woven fabric having an inclination of 45 degrees with respect to a direction of the carbon fibers on a surface layer of the preform portion, and the woven fabric is a plain weave woven fabric in which elastic polymer fiber bundles are formed with an inclination of 90 degrees.

12. A rotary machine comprising:

the composite blade according to claim 1.

* * * * *